United States Patent [19]

Wray

[11] 4,229,083
[45] Oct. 21, 1980

[54] TWO SPEED LOOP CONTROL ARRANGEMENT

[75] Inventor: William R. Wray, Sudbury, Mass.

[73] Assignee: Polaroid Corporation, Cambridge, Mass.

[21] Appl. No.: 32,911

[22] Filed: Apr. 24, 1979

[51] Int. Cl.² .............................................. G03B 19/18
[52] U.S. Cl. ......................................... 352/14; 226/44
[58] Field of Search .................. 307/233 R, 234, 353; 352/14; 226/44, 45

[56] References Cited

U.S. PATENT DOCUMENTS

| | | | |
|---|---|---|---|
| 3,660,680 | 5/1972 | Grundy | 307/234 |
| 3,723,891 | 3/1973 | Whiteley | 307/233 |
| 3,832,044 | 8/1974 | Deeran | 352/14 |
| 3,850,512 | 11/1974 | Scholz | 352/14 |
| 3,856,387 | 12/1974 | Wray et al. | 352/5 |
| 3,971,959 | 7/1976 | Flournoy | 307/233 |
| 4,020,423 | 4/1977 | Guyot et al. | 307/362 |

OTHER PUBLICATIONS

U.S. Patent Application Ser. No. 869131.
U.S. Patent Application Ser. No. 899864.

Primary Examiner—Monroe H. Hayes
Attorney, Agent, or Firm—Edward S. Roman

[57] ABSTRACT

A control system senses variations in the size of a buffer loop introduced in a magnetic recording tape or other flexible strip between a point of intermittent advance and a point of uniform advance. The control system maintains the size of the buffer loop at a selected measure by controlling the speed of the drive means which advances the tape uniformly. The control system has two response characteristics which cause the control system to react to variations in loop size either quickly or slowly depending on which response characteristic is chosen. During a first mode of operation, the faster response characteristic is chosen to establish the loop size quickly, while audio reproduction is muted. The control system then switches to a second mode of operation with the slower response characteristic which is compatible with audio reproduction. The control system employs an integrator responsive to an input signal indicative of loop size. The integrator output is a control signal which determines the speed of the drive mechanism for advancing the tape uniformly. In one embodiment, the signal indicative of loop size is provided by a circuit which produces an amplitude corresponding to the duty cycle of the output of a light detector which is illuminated via a path interrupted by the buffer loop. Preferably, the circuit includes a peak follower for the output of a gated integrator. The gated integrator provides a succession of rising output signals or "ramps" which time the duration of a first level of the light detector output. The peak follower is reset before the end of each ramp.

24 Claims, 6 Drawing Figures

TWO SPEED LOOP CONTROL ARRANGEMENT

BACKGROUND OF THE INVENTION

This invention relates to control apparatus for providing uniform advancement of a flexible strip, such as a flexible information-bearing medium, which is concurrently advanced at another location with intermittent motion. An example of such dual motions of a strip occurs in a sound motion picture projector, where a portion of the film is advanced step-wise past a visual projection station, while another portion is advanced uniformly past an audio station. To accommodate the two motions, a buffer loop is introduced between the two stations. Without synchronization, however, the buffer loop would contract and disappear, or grow excessively. Thus, where the drive mechanisms of intermittent and of uniform motions are mechanically independent, a system is needed for controlling the speed of the two mechanisms in relation to each other.

Theoretically, either the film drive mechanism or the audio drive mechanism, or both, can be regulated or controlled. However, excessive fluctuation in the speed of the audio medium past the sound transducer results in audio distortion. Thus, where design constraint rules out regulation or control of the film drive mechanism, the rate of control of the audio drive must be carefully limited. One approach to this problem is illustrated in U.S. Pat. Nos. 3,856,387 issued Dec. 24, 1974 to Wray et al. and 3,832,044 issued Aug. 27, 1974 to Deeran, both assigned to the assignee of the present application and both incorporated by reference herein. These patents disclose systems in which an alternating current (AC) film drive motor is unregulated, and a direct current (DC) audio capstan drive motor is controlled in response to the buffer loop level by a servomechanism having a relatively long time constant. A servomechanism or control system with a sufficiently long time constant to avoid audible distortion, however, is apt to be unable to seize initial control of the loop at the selected height if the loop starts growing more rapidly than the rate at which it will change dimension under normal steady-state operation. This, of course, limits the speed at which the loop can be formed initially. At the same time, however, it is desirable to improve even further upon the fidelity of audio reproduction by eliminating possibly perceptible speed changes in the audio capstan while maintaining a selected loop size.

In the initial establishment of the selected loop size, a further problem is encountered if the control system overreacts to detection of the loop and produces successively diminishing overcorrections in opposite directions. In this condition the speed at which the medium is uniformly advanced oscillates in an "under-damped" fashion above and below the nominal speed. Overcorrection will occur even though the medium continues to be intermittently advanced at a relatively constant speed. It would be desirable to arrive at the nominal speed of uniform motion more quickly and more directly once the loop is detected.

Although sound tracks are typically placed alongside the motion picture frames on the same strip, another system uses audio magnetic recording tape interwound with a separate film strip. This system, which has many advantages, especially for film chemically processed in a cassette, is described in detail in copending U.S. patent applications Ser. No. 869,131 filed Jan. 13, 1978 by Land et al. and Ser. No. 899,864 filed Apr. 25, 1978 by Wray, and both assigned to the assignee of this application and incorporated herein by reference. However, the two-strip system still requires synchronization of the uniform audio drive mechanism with the intermittent film drive mechanism.

The term "tape" is used herein to embrace information-bearing flexible media movable relative to an information-transferring transducer element, and whether encoded magnetically, or optically, and whether recorded in analog or digital fashion.

Accordingly, a general purpose of this invention is to provide an improved control apparatus and a method for synchronizing the concurrent intermittent and uniform advancements of a flexible strip.

A more particular object of the invention is to enable a servomechanism to seize initial control quickly of the height of a recording tape buffer loop without unduly interfering with audio reproduction from the tape.

Another object is to meet the above goals with a system which is applicable to film strips with sound tracks as well as to separate film and tape systems. Related objects include achieving the above objectives with reliable circuitry of minimum complexity.

SUMMARY OF THE INVENTION

A control system according to the invention maintains a constant average size of a buffer loop introduced in a recording tape or other flexible strip between a point of intermittent advance and a point of uniform advance. The control system senses variations in the loop size from a selected measure and produces a corresponding control signal which determines the speed of the drive means, preferably the one which advances the tape uniformly. The control system has two response characteristics. Depending on which response characteristic is chosen, the control system reacts to variations in loop size either quickly or slowly. The slower response characteristic is compatible with high fidelity audio reproduction. During a first mode of operation, the faster response characterstic is chosen to establish the loop size quickly while audio reproduction is muted. The control system then switches to a second mode, which is the normal playback condition, and operates with the slower response characteristic. At the beginning of the second mode, the control signal maintains the same level which it had at the end of the first mode to avoid a sudden speed variation.

In one embodiment, the control system employs an integrator with two selectable time constants of integration. The integrator input is provided by a circuit which produces an amplitude corresponding to the duty cycle of the output of a light detector. The buffer loop intermittently blocks the light incident on the light detector. Preferably, the circuit includes a peak follower for the output of a gated integrator. The gated integrator provides a succession of rising output signals or "ramps" which time the duration of a first level of the light detector output. The peak follower is reset before the end of each ramp, and is reset whenever the light detector output remains at a second level for a predetermined time.

In another embodiment, the faster response characteristic is provided by a circuit configuration which requires neither an integrator nor the circuit which produces a signal amplitude corresponding to the light detector duty cycle. Instead, the light detector output sets the drive means speed in a direct fashion in a first operating mode. In a second operating mode, however, the light detector output is filtered and integrated before being applied to control the speed of the drive means. When the loop first blocks the detected light, the control system generates a starting signal level or "DC offset" which operates the drive means at a nominal speed to achieve initial synchronization without overcorrection. The control system proceeds to control the speed from this common starting point.

In either embodiment, in the event a predetermined time interval occurs after the last transition in the loop detector output during the second mode, a timing circuit returns the control system to the first mode to quickly re-establish the loop size.

One significant advantage of the control system according to the invention is that it divides and isolates the functions of the control system. Thus strict control which might noticeably interfere with audio reproduction is limited to a brief interval dedicated to the sole purpose of establishing the loop size quickly and accurately. The ability to change to a slower response characteristic facilitates initial loop control without compromising audio fidelity. The preferred embodiment also provides for a return to strict control whenever necessary. The smoothness of the slower response characteristic, while unsuitable for initial capture of the loop size, eliminates perceptible variations in tape speed to attain an unusually high level of fidelity. With the provision of a loop responsive timing circuit for changeover, the invention provides a dual mode adaptive control system that automatically accomplishes the objectives of establishing the loop size and of maintaining it without audio distortion.

DESCRIPTION OF THE ILLUSTRATED EMBODIMENTS

Figure 1:
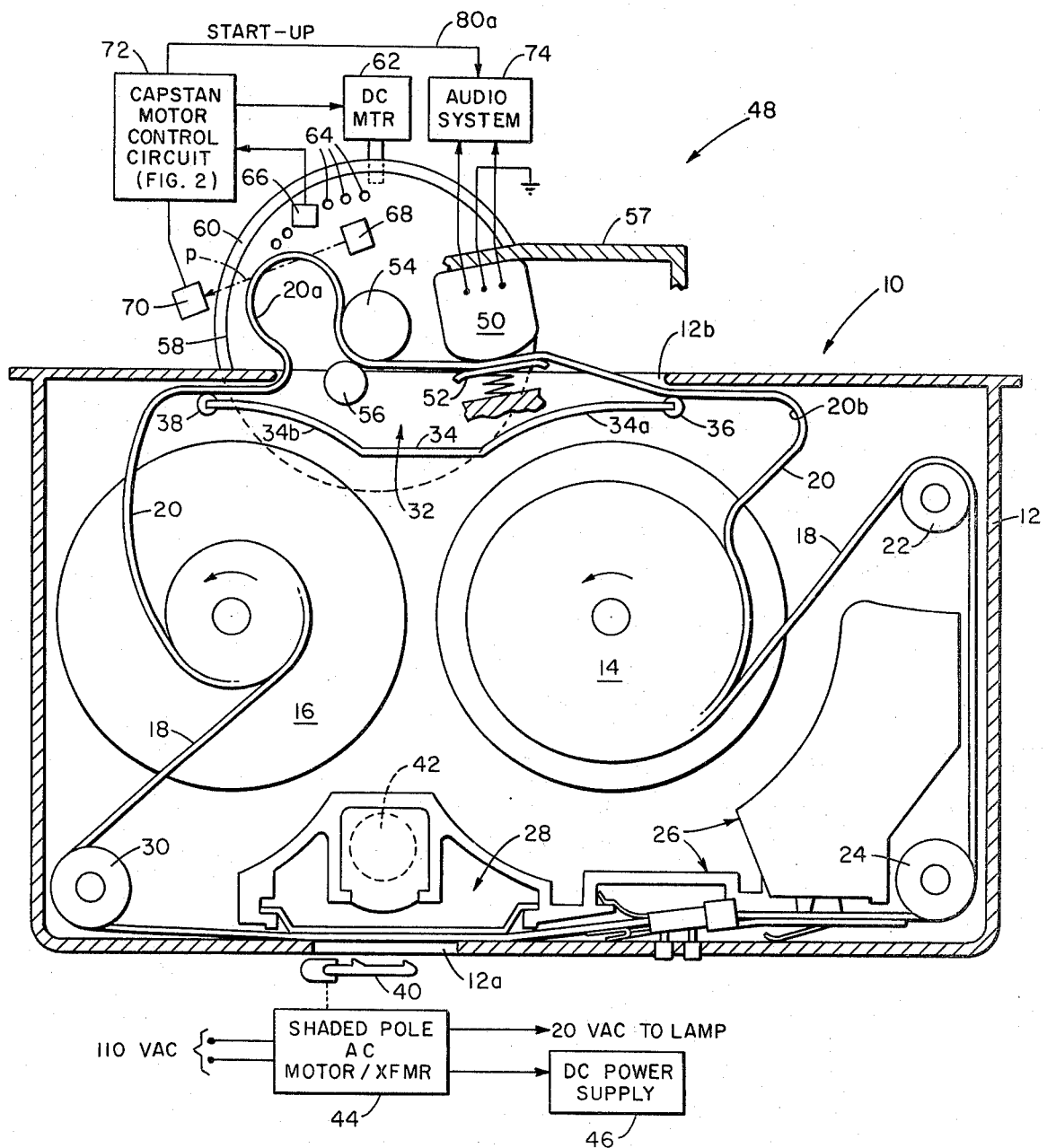
FIG. 1 is a partial schematic plan view and block diagram of an audio-visual film cassette in a projector having control apparatus according to the invention.

The cassette 10 shown in FIG. 1 includes a flat, box-shaped, and apertured housing 12 having an exposure/-projection window 12a and an audio window 12b. Supply and take-up reels 14 and 16 are coplanarly mounted in the housing between the photographic and audio windows 12a and 12b for rotation about parallel axes. The corresponding ends of motion picture film 18 and of audio magnetic recording tape 20 are affixed to the reels 14 and 16, respectively, and the tape and the film are interwound such that they form alternating layers. Protective edge rails (not shown) can be provided on the tape to protect the emulsion surface of the film, as explained in copending application Ser. No. 968,131. The film 18 and the tape 20 simultaneously unwind counterclockwise from the supply reel 14 and follow separate paths to the take-up reel 16. The film 18 successively proceeds around a bobulator roller 22 and an idler 24, past a film processing station 26 and an exposure/projection station 28, around a snubber roller 30, and back to the take-up reel 16 where it is rewound counterclockwise. The tape 20 proceeds around the other side of the cassette past an audio station 32. The audio window 12b is shielded by light baffle 34 with side spring members 34a and 34b that lightly urge posts or rollers 36 and 38 against the inside of the housing 12 adjacent opposite sides of the window 12b. The tape 20 successively passes over the post 36, through the audio station, over the post 38 and back to the take-up reel 16 where it is rewound with the film 18.

This cassette structure 10 is similar to that shown in FIG. 8 of copending application Ser. No. 869,131 as modified in FIG. 1 of copending application Ser. No. 899,864. It will be seen that the cassette uses interwound photographic film and recording tape, instead of the customary sound film that has a single strip with the sound track alongside the motion picture frames. The illustrated cassette 10 is designed to be inserted into a camera to expose the motion picture film and then placed in a projector where the film is developed and projected, all without removing the film from the cassette. Audio information can be recorded "live" while filming, or added later as background or narration, as when the cassette is in the projector.

FIG. 1 shows the cassette 10 in association with a sound motion picture projector having means (not shown) for locking the cassette in position so that the reels 14 and 16 and the windows 12a and 12b afford access to the film 18 and to tape-handling equipment in the projector. In particular, a reciprocating film advance claw 40 engages sprocket holes that aperture the film 18 and thereby intermittently advances the film across the window 12a frame-by-frame at a typical rate of about eighteen frames per second. A prism 42 behind the window 12a in the cassette reflects light from a projection lamp which enters the cassette along an axis perpendicular to the plane of FIG. 1. The light is reflected to pass through the film 20 and out the window 12a where it is projected for viewing. The projection equipment (not shown) includes a shutter mechanism connected with the claw 40 to open each time the film is momentarily stopped. The open shutter allows the image in each successive frame to be projected via a lens assembly to a viewing screen. The film claw 40 is operated through a conventional mechanical linkage by an AC shaded pole combination motor and transformer unit 44 powered by house current as described in U.S. Pat. No. 3,832,044. The transformer portion of the unit 44 provides relatively high current to the projection lamp at low voltage, and energizes a direct current power supply 46.

The foregoing structures of the cassette 10 which concerns the visual film 18, and of the projector, are commercially available in PolaVision (TM) movie picture equipment marketed by the Polaroid Corporation.

With further reference to FIG. 1, at the audio station 32 of the illustrated cassette 10, the projector has an audio recording/playback system 48 that has a magnetic transducer head 50 with a pressure pad 52 and a capstan 54 with a pinch roller 56. The audio components are mounted on support structure partially shown at 57 such that the pinch roller 56 and the pad 52 can be introduced into the cassette to engage the underside of the tape 20 and displace it towards the capstan 54 and the head 50. The capstan 54, typically made of polyurethane or other resilient frictional drive material, is connected for rotation with a driven flywheel 58. A peripheral flange 60 of the flywheel carries a resilient frictional drive covering and is engaged radially by the drive shaft of a DC motor 62 in a rim drive arrangement. The inertia of the flywheel 58 acts as a mechanical integrator to resist abrupt variations of speed of the capstan 54. If desired, the capstan 54 can employ a perforated vacuum hub that provides engagement with the tape over a relatively large surface area. If a vacuum hub is used, the pinch roller 56 is unnecessary. In addition, in place of the pressure pad 52, a vacuum drag pad (not shown) may be mounted in the support structure 57 on the other side of the transducer head 50 to draw the tape firmly against the transducer head 50. This alternate arrangement, while more costly, would have the advantage of being entirely external to the cassette 10.

Equally-spaced holes 64 aperture the flywheel 58 in a coaxial circular pattern, and a stationary light detector 66 is positioned to receive light which a lamp (not shown) on the other side of the flywheel projects through the holes 64. With this arrangement, the detector 66 produces an electrical signal with a pulse frequency directly proportional to the rotation rate of the capstan 54. It will be apparent to those skilled in the art that other known types of capstan drives and tachometers may be substituted for this illustrated arrangement.

As described in the abovenoted application Ser. No. 899,864, the capstan 54 and the pinch roller 56 introduce a buffer loop 20a into the magnetic tape. The loop projects through the window 12b outside the cassette between the capstan and the point where the tape re-enters the cassette. A stationary light source 68 and a light detector 70 are aligned to define a light path (p) which the top of the loop 20a intermittently interrupts. The outputs of the light detectors 66 and 70 are applied to a capstan motor control circuit 72. This circuit, in response, drives the DC motor 62 to maintain a selected average height of the loop 20a. As described below, the control circuit 72 provides this operation without abruptly changing the tape speed across the head 50. The head 50 is connected to record audio signals on the tape 20, and to play back recorded signals, through an audio reproduction system 74. As described below, the motor control circuit 72 mutes the reproduction system 74 during certain operating conditions.

The buffer loop 20a is provided because the takeup reel 16 rotates step-wise under the action of a slip clutch (not shown). That is, when the film drive claw 40 stops the film 18 to project a frame at the photographic station 28, the take-up reel is stationary and the clutch slips. When the claw 40 releases the film to snatch the next frame, the take-up reel advances momentarily to take up one frame length of the film 18. The tape 20 is connected to the same take-up reel and hence it also is taken-up intermittently. It may be desirable to introduce a second buffer loop 20b into the audio tape between the supply reel 14 and the post 36, i.e. before the audio station 32.

Except during rewind operation, the supply reel 14, on the other hand, is allowed to rotate freely. The bobulator 22 isolates the intermittent motion which the claw 40 inparts to the film from the supply reel, and hence the supply reel 14 tends to rotate continuously. (An additional isolation loop can of course be provided in the film between the bobulator 22 and the idler 24.)

The size of the loop 20a fluctuates at the frame rate, typically 18 Hertz, because the input end of the loop from the capstan 54 feeds tape continuously (e.g., at approximately three inches per second), while the speed of the output end of the loop at the post 38 alternates between zero and a figure much greater than the capstan feed speed depending on how fast the claw 40 operates. Thus each time the take-up reel 16 stops, the loop size 20a increases, whereas it decreases each time the take-up reel 16 moves. The light path (p) is located to cross a selected average loop height, so that the loop moves back and forth across the path as it changes size due to the incremental motion of the take-up reel 16.

If the claw frame rate falls due, for example, to a drop in line voltage, the average loop size gradually increases unless the capstan 54 slows down. Conversely, if the claw frame rate rises for some reason but the capstan 54 continues to operate at the same speed, the loop height diminishes. The motor control circuit 72, however, controls the audio capstan to maintain a selected average loop size, as is now described with reference to FIG. 2. This allows the claw 40 to operate without regulation, as is often desired.

Figure 2:
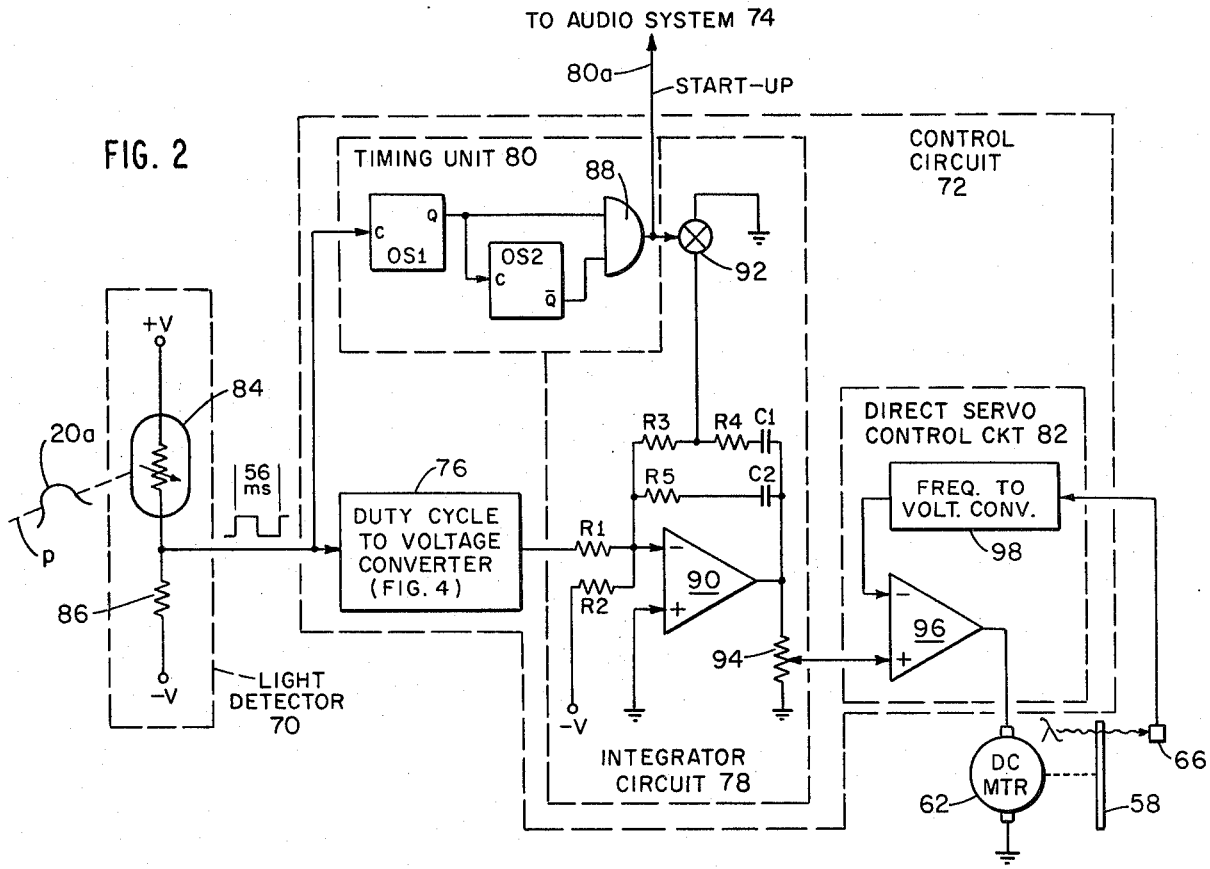
FIG. 2 is an electrical schematic and block diagram illustrating the capstan motor control circuit of FIG. 1 in more detail.

With reference to FIG. 2, a duty cycle-to-voltage converter 76 produces an output signal with an amplitude corresponding to the duty cycle of the output from the light detector 70. An integrator circuit 78 integrates the signal level from the converter 76 at one of two selected rates. A timing unit 89 responds to the output of the light detector 70 to select the rate of integrator operation. The output of the integrator circuit 78 forms the reference voltage for a direct speed regulation servo-control circuit 82. This circuit compares the motor speed information from the light detector 66 with the reference voltage from the integrator 78 to drive the DC motor 62 with a voltage level that tends to stabilize the motor speed and to keep the loop 20a (FIG. 1) at a selected average size. Those skilled in the art will recognize that the speed regulation circuit 82 is of conventional design and that modules are commercially available for that purpose, for example, a model TCA 955 device is available from Siemens AG.

The illustrated detector 70 includes a photoresistor 84 connected in series with a ballast resistor 86 to form a voltage divider connected between positive and negative supply voltages, each typically of (6) volts DC. As is characteristic of photoresistors, the resistance of resistor 84 increases each time the light path (p) is interrupted by the buffer loop 20a. If the resistance range from light to dark is in the order of 100 ohms to one megohm, the resistor 86 is approximately 500 kilohms so that the voltage swing is symmetrical about zero.

Figure 3:
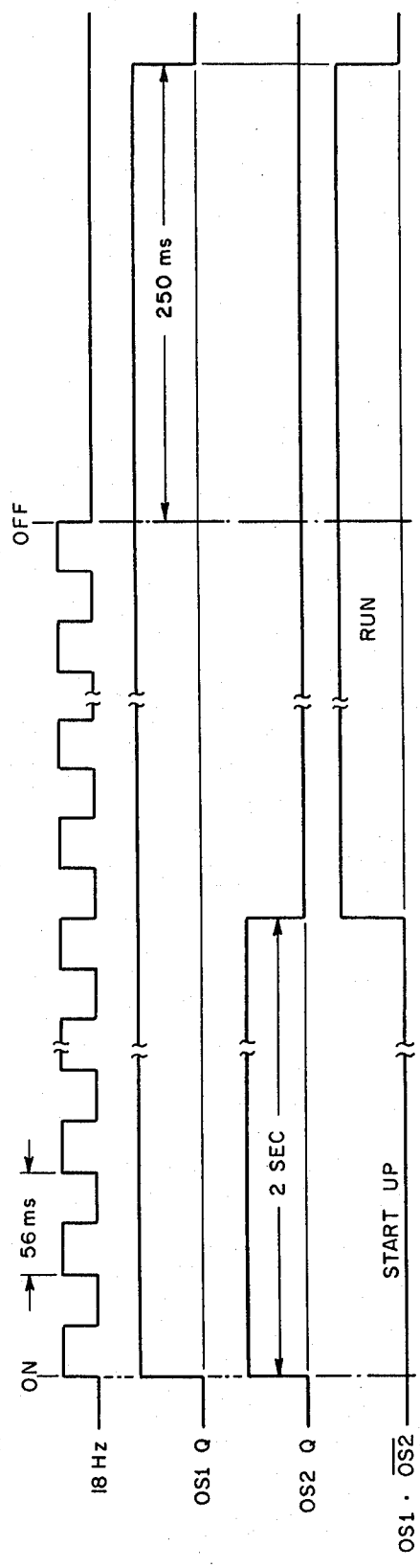
FIG. 3 is a timing diagram illustrating operation of the control circuit of FIG. 2.

The period of this output from the light detector 70 is approximately 56 milliseconds when the tape loop 20a is incrementally advanced at the 18 Hertz frame rate discussed above. This signal is fed to the timing unit 80, which includes a pair of delay circuits OS1 and OS2. OS1 is a retriggerable one-shot multivibrator which, as indicated at FIG. 3, produces a logic output level Q which goes to a high level in response to the first positive transition of the loop detector signal, i.e., when the loop first interrupts the light path (p). The astable period or time delay of the one-shot OS1 is several times longer than the 56 millisecond frame period, e.g., 250 milliseconds. Since OS1 is retriggerable, each positive transition of the light detector output restarts the astable period and its output level Q remains high until the light path is uninterrupted for 250 milliseconds.

A second one-shot OS2 times an independent interval of about one to three seconds, typically two seconds. The clock input for OS2 is the uninverted logic output of OS1. Thus, the logic output Q i.e., the complement of the Q output, from OS2 goes low in response to the first positive transition in the light detector output, and returns to the high level after a two second interval. An AND gate 88 normally produces an active output signal (here a binary ZERO), and responds to the coincidence of a high Q output from OS1 and a high Q output from OS2 to produce an inactive output. Hence, as shown in FIG. 3, the gate output is active, designating a first mode or START-UP operating period, except when the tape loop 20a (FIG. 1) is moved to repeatedly interrupt the light path (p) for the stable period of the one-shot OS2, illustrated as two seconds, in which case the gate output switches to an inactive level, designating a second mode or RUN operating period. The RUN interval stops when the one-shot OS1 switches to the stable state.

It will be apparent that, with this arrangement, the illustrated timing unit 80 is in the START-UP mode for at least the first two seconds after the system of FIG. 2 is turned on. It also switches back to the START-UP mode if the tape loop 20a fails to project across the light path (p) for 250 milliseconds, or if the loop 20a becomes so large that it continually obstructs the light path (p) for 250 milliseconds. In either case, the time delay for the Q output of OS1 will expire and OS1 will return to the stable state. This in turn ends the RUN mode and begins another START-UP mode. At other times, i.e., when the tape loop has been moving back and forth across the light path (p) for the two-second astable period of OS2, the unit switches to the RUN mode. The timing unit 80 hence functions as a selector of one of two operating modes for the FIG. 2 circuit.

With further reference to FIG. 2, the illustrated integrator circuit 78 has a linear analog amplifier 90 having two complementary inputs. The noninverting input of the amplifier 90 is grounded and the inverting input is connected to the output of the converter 76 through resistor R1. The inverting input of amplifier 90 is also connected to a negative supply voltage through resistor R2. Resistors R1 and R2 provide a weighted sum voltage to the amplifier 90. The values of resistors R1 and R2 are chosen so that the input to the amplifier 90 will be symmetrical about zero, or ground. The amplifier output is connected back to the inverting input by a feedback circuit employing two parallel paths, the first of which includes a pair of resistors R3 and R4 in series with a RUN capacitor C1 connected directly to the output of the amplifier 90. The junction between resistors R3 and R4 is connected to ground via an electronic gate or switch 92 operated by the AND gate output of the timing unit 80. The second parallel path of the feedback circuit has a resistor R5 in series with a START-UP capacitor C2.

The gate 92 is open when the AND gate 88 output is inactive, i.e., during the RUN mode, but switches in response to an active, START-UP, input signal. Accordingly, the gate 92 is closed during a START-UP period so that the point between resistors R3 and R4 is grounded. This places the RUN capacitor C1 and resistor R4 across the output of the amplifier 90. The integrator output charges the RUN capacitor C1 with an average time determined by resistor R4. The damping resistor R3 adds stability to the feedback loop. The capacitance of RUN capacitor C1 is typically 100 times that of capacitor C2. Thus, during a START-UP period, the time constant of integration is defined by the product of the input resistor R1 and the START-UP feedback capacitor C2 to produce a relatively fast response. That is, the integrator 78 operates with a relatively fast rate in this first, START-UP, mode.

In the RUN mode, the gate 92 is open and the predominant time constant of integration is afforded by R1-C1. Moreover, since capacitor C1 was present at the output of amplifier 90 at the end of the START-UP period, it already has a level of charge determined by the integrator operation at the transition from the START-UP mode to the RUN mode. Hence, whereas the rate of integration changes when the RUN mode begins, the charge on capacitor C1 minimizes any discontinuity in the integrator output level to a relatively insignificant amount.

With continued reference to FIG. 2, a potentiometer or variable voltage divider 94 connected across the output of the amplifier 90 applies a portion of the output of the integrator circuit 78 to the direct servo-control circuit 82. This signal forms the reference voltage for the noninverting input of a linear operational amplifier 96 whose output voltage is applied across capstan-driving DC motor 62. The light detector 66 for the slotted disc encoder on the flywheel 58 develops a frequency signal proportional to motor speed. A conventional frequency-to-voltage converter 98 responds to the frequency signal to produce a signal level representing motor speed, in the nature of a tachometer signal, which is applied to the inverting input of the amplifier 96.

When the output of integrator 78 remains constant, the servo-control circuit 82 keeps the motor running at a uniform speed, and thus acts as a speed regulator. This means, for example, that the voltage applied to the motor automatically increases to accommodate an increase in drag or other speed-reducing factor. Thus, minor fluctuations in speed of the motor 62 are corrected before they appear in the output of the light detector 70. In addition, the integrator circuit "steers" the direct servo-control circuit 82 over the long term to regulate motor speed in accordance with the signal from the integrator circuit.

With this construction and operation, the motor control circuit 72 which the invention provides operates initially with a fast response characteristic to drive the capstan motor to establish the tape loop 20a with an average height at the level of the light path (p), FIGS. 1 and 2. During this operation with a fast integrator 78 response rate, the speed at which the tape 20 is driven can change rapidly enough to distort the playback and the recording of audio information. Accordingly, recording can be inhibited, and playback muted, with the signal from the timing unit 80. For this purpose, a line 80a applies the mode-designating signal from the timing unit to the audio system 74.

The timing unit 80 functions as a mode selector and signals the transition from START-UP operation to RUN operation, as previously described. The output signal from the unit 80 during the RUN mode conditions the audio system 74 for playback and record operations. It also switches the integrator 78 to operate with a considerably slower response rate. The control circuit 72 consequently drives the capstan motor 62 to maintain the previously established average tape loop size, but restricts the rate of changing the motor speed to a level that does not result in perceptible distortion of audio signals.

Figure 4:
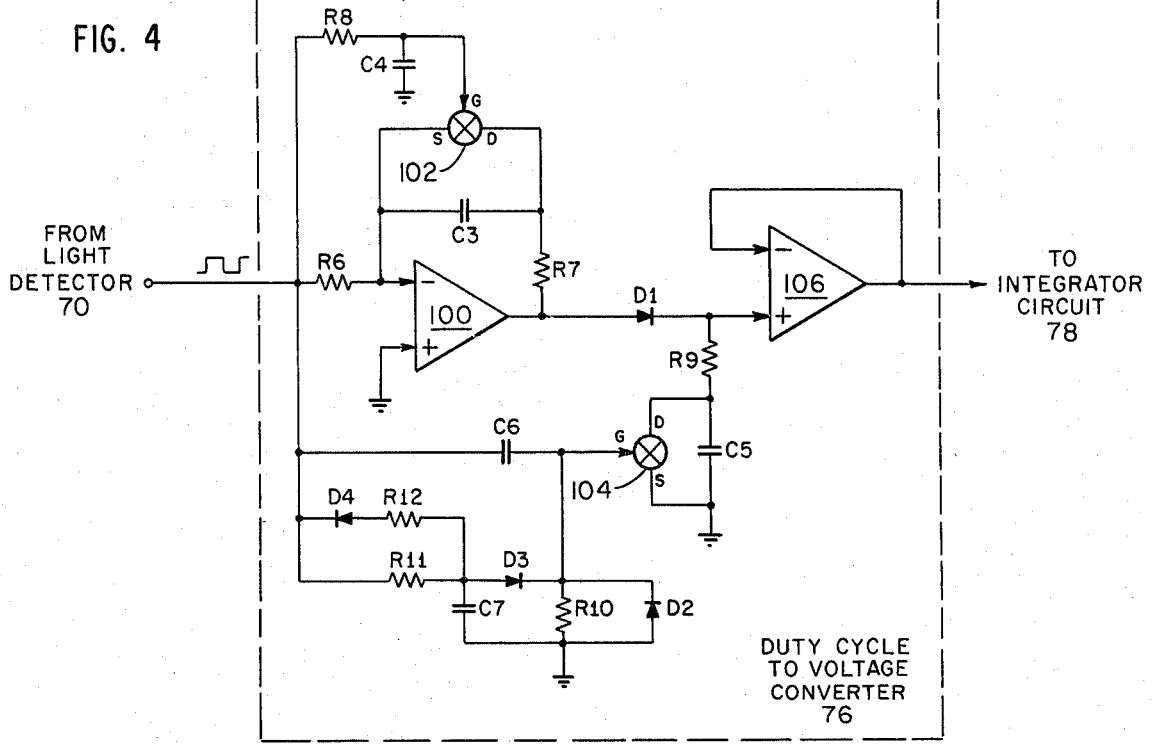
FIG. 4 is an electrical schematic and block diagram of the duty cycle-to-voltage converter of FIG. 2.

The motor control circuit 72 illustrated in FIG. 2 employs a duty cycle-to-voltage converter 76 preferably constructed as shown in FIG. 4. This circuit provides accurate conversion in a manner that produces an output signal that is essentially free of ripple or other noise due to input signal variations at the intermittent frame-rate, e.g. 18 Hertz. Such disturbances at the input of integrator 78 are detrimental because they tend to cause corresponding noise in the integrator output, with the result that they are applied to the capstan motor 62. The resultant nonuniformity of motor operation can cause audio distortion. The converter 76, as noted, produces an output signal essentially free of such unwanted components, as now described with reference to FIG. 4.

The duty cycle-to-voltage converter 76 includes a linear operational amplifier 100 connected as an integrator with a grounded noninverting input and an inverting input connected to receive the time-varying output of the light detector 70 (FIG. 2) via input resistor R6. The light detector output is normally a square wave with a frequency of 18 Hertz and an amplitude nearly symmetrical about zero with a duty cycle varying from zero to 100 percent. The amplifier output is connected via a damping resistor R7 (for dynamic stabilization) to an integrating feedback capacitor C3. A gate 102 is connected across the capacitor and is controlled by the light detector output through an RC delay circuit that employs a series resistor R8 followed by a grounded parallel capacitor C4. This arrangement results in gate 102, which preferably is a fast-acting switch such as a MOSFET, being closed when the detector 70 output signal has a high value and open so that the capacitor C3 is charging or "ramping" where the detector signal is low. The R8-C4 circuit, however, slightly offsets or delays the succession of ramps produced by the integrator amplifier 100, relative to the timing of the light detector signal.

A peak follower circuit is connected to the output of the integrator amplifier 100 and includes a series diode D1 followed by a holding capacitor C5 having one side connected to ground and the other side connected to diode D1 via charging resistor R9. When the charge on capacitor C5 exceeds the output of the integrator, the diode D1 is reverse-biased, and blocks the integrator output from the capacitor C5. On the other hand, when the integrator output is higher than the capacitor C5 charge, the capacitor charges further to the higher value. The output voltage from the junction of diode D1 and resistor R9 is applied to the integrator circuit 78 (FIG. 2) via an isolation amplifier 106 that functions as a voltage follower.

Capacitor C5 is shunted by a discharge gate 104, preferably also a fast-acting MOSFET device, coupled to the light detector output via a differentiating capacitor C6 followed by a grounded discharge resistor R10. When series capacitor C6 turns the gate 104 on, the parallel resistor R10 discharges the capacitor C6 quickly to turn the gate off, so that gate 104 is only closed momentarily. Otherwise it is in the open condition. Diode D2 shunts negative going transitions to ground or other common return conductor.

When the light detector 70 output is high for a long time, it charges a relatively large capacitor C7 through resistor R11 to turn on the gate 104 through the series diode D3. The charge on capacitor C7 is dumped through resistor R12 and diode D4 when the input goes negative.

The following table provides, by way of illustrative example, representative values of the resistances and capacitances employed in a presently preferred embodiment of the integrator 78 and the duty cycle-to-voltage converter 76.

TABLE

| Circuit Element | Value |
|---|---|
| R1 | 2 megohms |
| R2 | 4 megohms |
| R3 | 1 megohm |
| R4 | 200 kilohms |
| R5 | 10 megohms |
| R6 | 100 kilohms |
| R7 | 6.2 kilohms |
| R8 | 6.2 kilohms |
| R9 | 510 kilohms |
| R10 | 39 kilohms |
| R11 | 39 kilohms |
| R12 | 1.5 kilohms |
| C1 | 3 microfarads |
| C2 | 0.03 microfarad |
| C3 | 0.47 microfarad |
| C4 | 0.0027 microfarad |
| C5 | 0.0033 microfarad |
| C6 | 130 picofarads |
| C7 | 2.2 microfarads |

Figure 5:
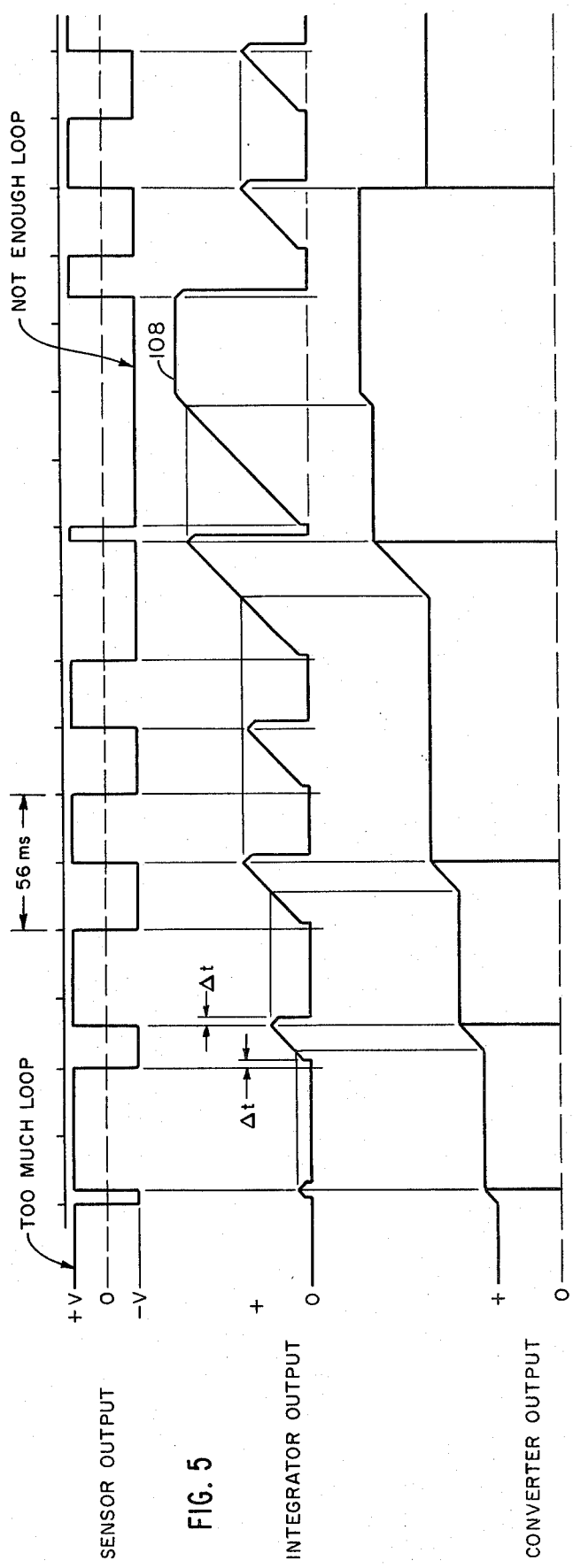
FIG. 5 is a timing diagram illustrating operation of the duty cycle-to-voltage converter of FIG. 4.

The detailed operation of the duty cycle-to-voltage converter circuit 76 can be understood with reference to FIGS. 3 and 5. The first waveform at the top of FIG. 5 represents the light detector 70 output, which changes between the $+V$ and $-V$ supply levels. The zero line corresponds to the ideal condition where the loop is stationary at the level of the light path (p). A high signal, $+V$, from the light detector means that the loop is above the light path nd interrupting the light. A low signal, $-V$, indicates that the loop is below the uninterrupted light path. If the light detector signal were consistently high, it would mean that the loop is too large, and the capstan motor 62 should be slowed down. Conversely, if the light detector output were consistently low, it would mean that the loop is too small, and the capstan motor should be speeded up.

The integrator formed by the amplifier 100, input resistor R6 and feedback capacitor C3 integrates only when the loop is low, that is, when the light detector output is at the $-V$ level. As shown in FIG. 5 the spaces between the ramps in the integrator output correspond to occurences of the high condition in the light detector output. This condition also keeps the gate 102, closed which short circuits the feedback capacitor C3. The slope of the integration ramp depends on the R6-C3 product. The amount of delay ($\Delta t$) or shift of the ramp depends on the R8-C4 product; the delay with the foregoing component values is in the order of 150 microseconds. A negative transition in the detector 70 signal initiates the delay ($\Delta t$) after the gate 102 opens, which allows the ramp to form. When the detector 70 signal goes high, it initiates another delay of ($\Delta t$), after which the gate 102 becomes conductive (i.e. closed). Thus, the integrator develops voltage ramps that are slightly offset in time with respect to the low levels of the input signal. In effect, each ramp times the low level signal condition and accordingly attains a higher voltage over a longer period of time. This operation is limited when the capacitor C3 eventually reaches full charge, as shown at point 108 in FIG. 5.

The lower waveform in FIG. 5 shows the voltage at the junction between diode D1 and resistor R9, i.e., the output of the duty cycle-to-voltage convertor 76. The voltage on capacitor C5 follows the maximum voltage at the output of the amplifier 100 integrator. However, each time the input signal to this integrator goes high, the gate 104 is momentarily closed and reopened. Capacitor C6 is small so that there is a relatively instantaneous discharge of the holding capacitor C5, for example, in five microseconds. The holding capacitor C5 itself is low in capacitance so that it can respond essentially instantaneously to a rising level from the integrator. The gate 104 does not respond to a negative going transition in the detector 70 signal, due to diode D2.

In the fully charged condition shown at point 108 on the integrator output waveform, which corresponds to the tape loop being too small, the capstan motor is driven increasingly faster, because the constant output level is integrated in the dual time constant integrator circuit 78 (FIG. 2).

On the other hand, when the loop is so large that the light detector output level stays high for several periods, the holding capacitor C5 holds or stores charge produced at a time when the loop was of lower average size and the circuit has no way of knowing how long the level has remained high. To avoid this problem, a relatively large capacitor C7 is charged by the detector 70 signal through resistor R11 until diode D3 becomes conductive. Conduction in diode C3 closes gate 104 and keeps it closed until the detector 70 signal goes negative. While this condition is not shown in FIG. 5, it can be appreciated by looking at the left-hand portion of the middle waveform in FIG. 5, where the light detector output is high for several cycles. If this period had been long enough to charge capacitor C7 to a level where it could operate gate 104, then the converter output signal, i.e., the charge on capacitor C5, would drop to zero until such time as the detector 70 signal drops to the low level. This is effective, because the high detector signal means there is too much loop, and the capstan motor must be slowed down. In the zero level, the output of the duty cycle-to-voltage converter results in a negative input to the integrator circuit 78 by virtue of the bias resistor R2 connected to $-V$ as shown in FIG. 2. This means that the output of the integrator circuit will be falling at the maximum rate, thus reducing the motor speed and the loop as rapidly as possible with this circuit.

Thus, the duty cycle-to-voltage converter circuit 76 of FIG. 4 converts the incoming 18 Hertz signal from the light detector 70 to a relatively steady continuous signal level. The converter 76 output follows the duty cycle of the detector 70 signal with precision and eliminates the 18 Hertz frequency component or ripple which would otherwise appear as noise at the output of the dual time constant integrator circuit 78 and which could otherwise effect the operation of the DC motor 62.

From the foregoing discussion of the circuits of FIGS. 2 and 4 it will be appreciated that the capstan motor control circuit 72 serves the two functions of setting the loop size and of maintaining the loop size without audio distortion. The response characteristics needed for these tasks are different. The ability to change over from one mode to the other without a discontinuity in control allows these conflicting tasks to be performed separately. Thus the control system provides a first operating mode with a fast response characteristic dedicated to the sole purpose of setting the loop size without regard to audio distortion. The second mode has a slower response characteristic compatible with audio reproduction. While this response characteristic is unsuitable for setting loop size initially, it suffices to maintain loop size. This principle of operation is not limited to dual time constant integrators. While the slow response characteristic for the RUN mode is achieved by integration, the faster response characteristic in the START-UP mode can be implemented without integration and with relatively little reactance in many applications.

The dynamic stability of the overall system depends on mechanical inertia and electrical reactance. If these factors provide sufficient dynamic stability, there may be no need—even in the RUN mode—to remove the 18 Hertz ripple component from the light detector 70 output. Where this is the case, the duty cycle-to-voltage converter 76 is unnecessary. The inherent stability and characteristic response of the system as a whole makes ripple a negligible factor. The dynamic stability also tends to narrow distinctions between response characteristics. Thus in the START-UP mode, omitting the integration step may be possible without noticeably changing the overall characteristic response.

Figure 6:
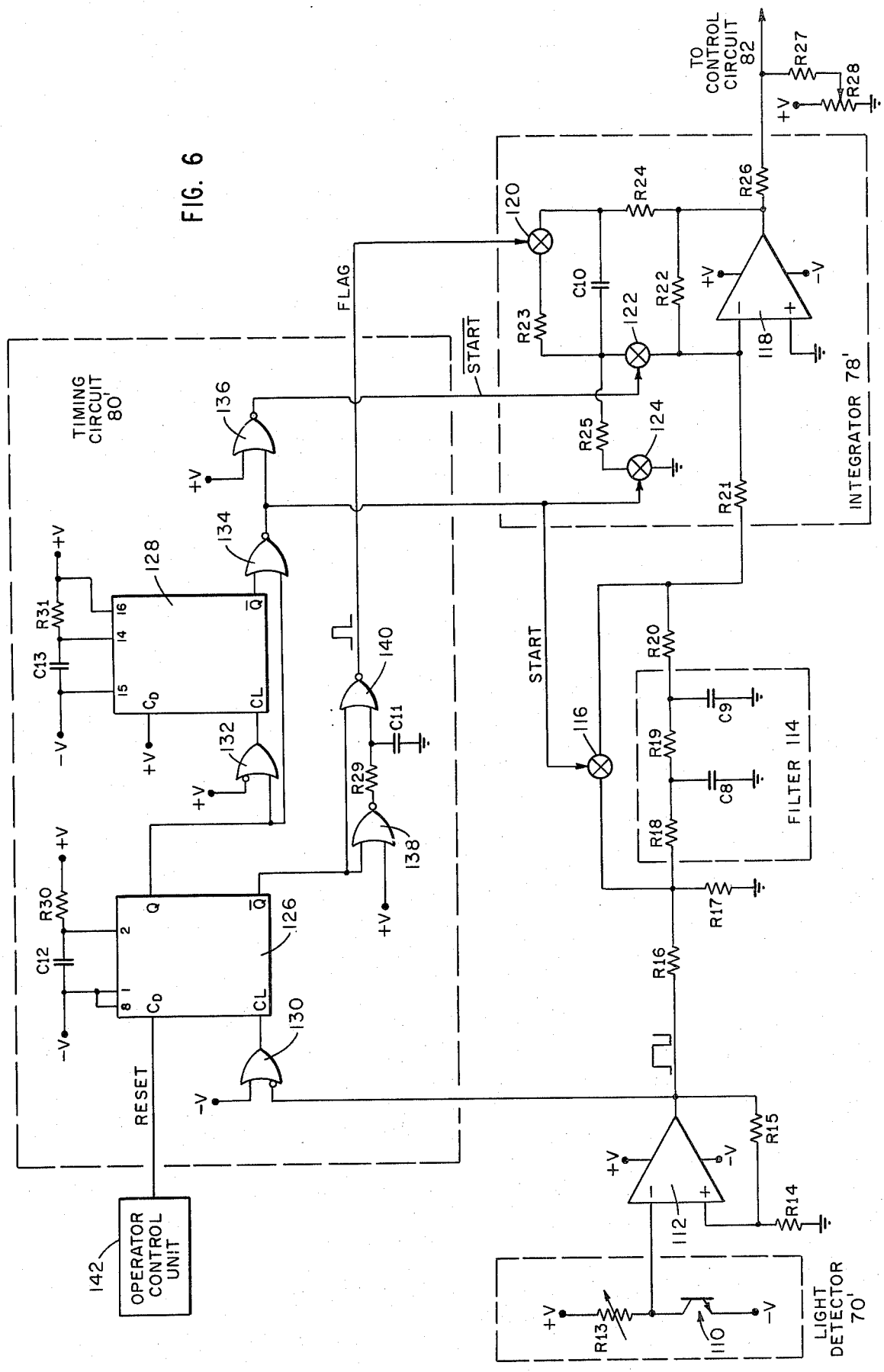
FIG. 6 is an electrical schematic and block diagram of another embodiment of the capstan motor control circuit of FIG. 1.

FIG. 6 illustrates another embodiment of the control circuit 72 in which the duty cycle-to-voltage convertor 76 and START-UP capacitor C1 (FIG. 2) are not used. As in the above discussion, it is presumed that inherent dynamic stability makes the motor speed essentially immune to the ripple component and allows ommission of integration in the START-UP mode.

A modified light detector 70' includes a photo-transistor 110 connected between positive and negative supply voltage through a variable resistor R13. The junction between the photo-transistor 110 and variable resistor R13 is connected to the inverting input of a linear operational amplifier 112 which serves as a detector amplifier. The noninverting input of the detector amplifier 112 is connected to ground through a resistor R14. The noninverting input is also connected to the output of the amplifier by a feedback resistor R15. The variable resistor R13 is set to make the input to the detector amplifier 112 nearly symmetrical about zero or ground. The output of the amplifier 112 is connected through voltage-dividing resistors R16 and R17 to ground. The junction of resistors R15 and R16 is connected to a two-pole R-C low pass filter 114 which is connected to a modified amplifier/integrator circuit 78'. The filter 114 can be bypassed by a gate 116, which is protected by isolation resistor R20 from being grounded through the capacitor C9.

The output of the filter 114 is connected via series resistor R20 and input resistor R21 to the inverting input of a linear operational amplifier 118. The noninverting input is grounded. The amplifiers 112 and 118 are preferably low current FET-input operational amplifiers, an example of which is the National Semiconductor Co. LF353N product. A feedback network from the output of the amplifier 118 to the inverting input includes two feedback paths. The first feedback path includes a permanent feedback resistor R22. The second feedback path includes a RUN capacitor C10. The capacitor C10 can be discharged through resistor R23 by shunt gate 120. A resistor R24 joins the feedback paths at the output side of the amplifier. On the input side of the amplifier 118, the two feedback paths are joined through a gate 122. The junction between the gate 122 and RUN capacitor C10 is coupled through resistor R25 and another gate 124 to ground. The output of amplifier 118 is passed to the control circuit 82 (FIG. 2)

via resistor R26. Resistor R27 and potentiometer R28 are in parallel with the output resistor R26. The value of R27 is at least ten times as large as the maximum resistance to ground provided by potentiometer R28 to avoid altering the gain of the amplifier 118.

Gates 116, 120, 122, and 124 are operated by a modified timing circuit 80' which includes a pair of one-shot multivibrator circuits 126 and 128 (e.g., a Motorola MC14538 int amplifier 112 is connected to the clock input of a retrigerable one-shot circuit 126 through the inverted input of an OR gate 130 having another input at negative supply voltage. The logic output Q of the one-shot circuit 126 is connected to the clock input of the other one shot circuit 128 via an OR gate 132. The delay times and operation of the one-shot circuits 126 and 128 are analogous to those of OS1 and OS2 in FIG. 2. The Q output of the one-shot circuit 126 and the Q output of one-shot circuit 128 form the inputs to a NOR gate 134 whose output is the START-UP or "START" signal. NOR gate 136 provides the complement START signal. The START signal defines the first operating mode or START-UP mode and may be employed, as in FIG. 2, to mute audio reproduction. The START signal closes gates 116 and 124 simultaneously. At the same time the START signal assumes the low state which opens the gate 122. In the START-UP mode, gate 116 bypasses the filter 114 and gate 124 removes the RUN capacitor C10 from the feedback path and connects it across the output of the amplifier 118 in series with resistors R24 and R25. Thus, the output of the amplifier 118 is an amplified replica of the loop detector output. With the RUN capacitor across the output, however, the output of amplifier 118 will be smoothed to a relatively small extent by the filtering action of the RUN capacitor.

The $\overline{Q}$ output of the one-shot circuit 126 is connected to a pair of NOR gates 138 and 140. The gate 138 has another input connected to positive supply voltage. The output of the NOR gate 138 is connected by a delay circuit including resistor R29 and parallel capacitor C11 to the other input of the NOR gate 140. The output "FLAG" of NOR gate 140 is the logic control input to RUN capacitor discharge gate 120. As the buffer loop first crosses the light path, there is a positive transition in the detector 70' output. This produces an output pulse from the NOR gate 140 in the timing circuit 80' which discharges RUN capacitor C10 through resistor R23. This places the output of the amplifier 118 approximately at ground. Potentiometer R29 is set initially to provide a positive DC offset voltage to the amplifier 96 (FIG. 2) in the direct servo-control circuit 82.

In the START-UP period, the RUN capacitor C10 is disconnected from the feedback path and connected across the amplifier output. When the loop crosses the path (p), the RUN capacitor is shortcircuited. This results in the output of amplifier 118 being grounded. Thus, at that time, essentially the only voltage applied to control the motor 62 is the DC offset. This is effective since at the moment the loop first crosses the light path, it is known to be approximately the right size. A preselected nominal control voltage can be used to halt the growth of the loop with less chance of overcorrection. The nominal speed set by the DC offset is typically within ±4% of the correct synchronization speed. Immediately after the momentary shunting of the capacitor C10, the active control of START-UP mode resumes monitoring and adjusting the motor speed with the fast response characteristic.

When the START-UP period ends, the logic signals START and $\overline{START}$ reverse, the gate 122 closes, and the gates 116 and 124 open. In this configuration, the RUN capacitor C10, which is charged to the most recent integrator output level, is connected back into the feedback path to form the integrator 78'. At the same time, low pass filter 114 is introduced. The action of the filter 114 and integrator 78' (with feedback capacitor C10) produce a slower response characteristic suitable for the RUN (i.e., $\overline{START}$) mode.

The CLEAR-DIRECT terminal of the retrigerable one-shot circuit 126 is preferably connected to receive a RESET signal when the projector is switched between the projection mode and the rewind mode by an operator control unit 142 to ensure that the one-shot circuits 126 and 128 are in the correct state when the next projection begins.

In summary, with further reference to FIG. 6, a preselected DC offset drives the motor at a nominal speed when the loop is first detected. This is in effect a nearly instantaneous response characteristic. Control is then released to the fast response characteristic circuit without filter or integrator and later to the slower response characteristic circuit with filter and integrator. Thus, once the loop is detected, the response characteristic becomes progressively slower in three stages to ensure maintenance of control throughout the operation.

Illustrative values of resistance and of capacitance in a presently preferred embodiment of the control circuit shown in FIG. 6 are given below in Table II.

TABLE II

| | |
|---|---|
| R13 | 50 kilohms |
| R14 | 10 kilohms |
| R15 | 300 kilohms |
| R16 | 10 kilohms |
| R17 | 3 kilohms |
| R18 | 2.2 kilohms |
| R19 | 100 kilohms |
| R20 | 10 kilohms |
| R21 | 4.7 megohms |
| R22 | 10 megohms |
| R23 | 100 ohms |
| R24 | 150 kilohms |
| R25 | 200 kilohms |
| R26 | 110 kilohms |
| R27 | 100 kilohms |
| R28 | 10 kilohms |
| R29 | 100 kilohms |
| R30 | 1 megohm |
| R31 | 620 kilohms |
| C8 | 6.8 microfarads |
| C9 | 0.33 microfarad |
| C10 | 3 microfarads |
| C11 | 0.12 microfarad |
| C12 | 1 microfarad |
| C13 | 4.7 microfarads |

While the control system disclosed herein has been described in association with a dual film and tape audiovisual control system, features of the invention are equally applicable to speed control of a film strip with an integral sound track, or of another flexible elongated element by monitoring a buffer loop between points of intermittent and of uniform advancements. Nor is the invention limited to a particular type of drive mechanism although it is preferred to control a DC motor for uniform advancement. All numerical values of electrical voltage and current, timing, frequency, resistance and capacitance given herein are for the purpose of illustration only.

One of the chief advantages of the disclosed system lies in providing a faster response characteristic when setting loop size and a slower response characteristic when maintaining loop size. This enables the use of a more slowly responding control system when the apparatus is in the normal playback condition. The slower response characteristic improves the audio fidelity by avoiding speed changes which are perceptible as audio distortion. At the same time, however, the loop size is set more quickly and accurately.

The foregoing description is illustrative, rather than restrictive of the implementation and application of the control system, and the appended claims define the scope of the subject matter sought to be protected. The claims are intended to embrace all variations and modifications of the control system falling within the range of equivalents.

What is claimed is:

1. In a control apparatus for providing controlled movement of a flexible strip between a supply location from which the strip is withdrawn at a uniform rate and a takeup location to which the strip is advanced at a nonuniform rate, the improvement comprising:
   means for driving the strip at a sufficient speed to at least establish and maintain a buffer loop between the strip supply location and the strip takeup location; and
   control means responsive to variations in the size of said buffer loop from a select size for controlling the speed of said drive means to establish and maintain said loop substantially at said selected size, said control means being operable in either a first relatively fast mode of response or a second relatively slow mode of response, said control means also comprising means for transferring control of the speed of said drive means between said first fast response and said second slow response without substantial immediate change in the average speed of said drive means.

2. In apparatus according to claim 1, the further improvement wherein said control means comprises mode-selecting means for actuating said control-transferring means to control the speed of said drive means initially at said relatively fast response, and to control said speed at said relatively slow response only in response to said loop reaching said selected size.

3. In apparatus according to claim 1 wherein said strip is an audio recording medium and said drive means provides for uniform advancement of said strip between the locations of supply and takeup, the further improvement comprising:
   means for providing an audio output in response to the advancement of said recording medium thereby, and
   means for muting said audio output during control by said first control means.

4. In apparatus according to claim 1, the further improvement wherein said control means includes feedback capacitor elements arranged to be switched between a first arrangement to provide a first time constant of integration corresponding to said fast time response and a second arrangement to provide a second time constant of integration corresponding to said slow time response.

5. In apparatus according to claim 2, the further improvement wherein the nonuniform advancement of the strip to the takeup location is at an intermittent advancement, wherein said control means includes loop sensor means for producing a time-varying output indicative of whether the instantaneous size of said loop is above or below said selected size, and wherein said mode-selecting means includes:
   retriggerable delay circuit means responsive to said loop sensor means and having a delay period which is longer than the norminal frame period for producing a logic output which changes from one level to another level when said loop size first exceeds said selected size and which remains at the other level until the entire delay period has expired without said loop size changing from below to above said selected size;
   further delay circuit means responsive to the change of said retriggerable delay circuit means from said one level to said other level for producing a logic output which changes from one level to another level and returns to said one level after an independent time interval; and
   gate means responsive to a logic combination of the outputs of said delay circuit means for producing a logic signal having one level corresponding to said first mode and another level corresponding to said second mode, the second mode logic level occurring from the end of said independent time interval of said further delay circuit means to the end of said delay period of said retriggerable delay circuit means.

6. In apparatus according to claim 1, the further improvement wherein said control transferring means includes an electrical integrator operable with any one of said rates of response, said integrator having a capacitive element connected for receiving electrical charge during operation with one of said modes of response and further connected for applying the charge thereon to establish an initial output level of said integrator when operation with another mode of response begins, said initial level being approximately the same as the immediately preceding output level of said integrator during operation with said one mode of response, whereby a smooth transition from said one mode of response to said other mode of response is achieved.

7. In apparatus according to claim 1, the further improvement wherein said control means includes:
   control means responsive to variations in the size of said buffer loop for producing a control signal output level for determining the speed of said drive means to establish and maintain said selected loop size at the selected mode of response;
   means for storing an electrical signal level corresponding to the output level of said control signal means during operation with one of said modes of response; and
   means responsive to said control transferring means for establishing an initial output level of said control signal means at the beginning of operation with the other mode of response, said initial output level being approximately the same as the immediately preceding output level of said control signal means while operating with said one mode of response, whereby a smooth transition from said one mode of response to said other mode of response is achieved.

8. In apparatus according to claim 1, the further improvement wherein said means for controlling said drive means includes:

an amplifier having an input terminal and an output terminal providing a control signal for determining the speed of said drive means;

a feedback circuit connected between the output and the input of said amplifier, said feedback circuit having at least one capacitive element; and means responsive to said control transferring means for establishing a first and then a second circuit configuration corresponding respectively to the faster and slower rates of response, the first circuit configuration having said one capacitive element disconnected from said feedback circuit and connected instead across the output of said amplifier, and said second circuit configuration having said one capacitive element reconnected into said feedback circuit, whereby a smooth transaction from a faster rate of response to a slower rate of response is achieved.

9. In apparatus according to claim 8, the further improvement wherein said feedback circuit has two capacitive elements arranged such that when said one capacitive element is disconnected the other capacitive element remains in the feedback circuit.

10. In apparatus according to claim 9, the further improvement wherein said capacitive elements are connected in parallel circuit paths in said feedback circuit, and said control transferring means includes:

gate means connected between a return conductor and a point between said one capacitive element and the interconnection of said feedback circuit with said amplifier input, for disconnecting said one capacitive element from said feedback circuit and reconnecting it across the integrator output.

11. In apparatus according to claim 8, the further improvement wherein said means for controlling said drive means further includes:

means for adding a preselected offset signal level to the output of said amplifier corresponding to a nominal speed of said drive means; and means responsive to variations in the size of said loop for momentarily discharging said one capacitive element when the size of said loop first attains said selected size.

12. In control apparatus for providing controlled movement of a flexible strip-like recording medium between a supply location from which the strip is withdrawn at a uniform rate and a takeup location to which the strip is advanced at a nonuniform rate, the improvement comprising:

means for driving the strip at a sufficient speed to at least establish and maintain a buffer loop between the strip supply location and the strip takeup location;

means responsive to the drive means for producing a speed signal indicative of the speed at which said drive means is operating;

control means responsive to variations in the size of said buffer loop for producing a loop signal to control the speed of said drive means to establish and maintain said loop at a selected size, said control means being operable in either a first relatively fast mode of response or a second relatively slow mode of response to provide said loop signal, said control means also comprising:

means for transferring control of the speed of said drive means between said fast mode of response and said second slow mode of response without substantial immediate change in the level of said loop signal; and speed regulation means responsive both to said speed signal and said loop signal for maintaining the speed of said drive means.

13. In apparatus according to claim 12, the further improvement wherein said control means includes feedback capacitor elements arranged to be switched between a final arrangement to provide a first time constant of integration corresponding to said last time response and a second arrangement to provide a second time constant of integration corresponding to said slow mode of response.

14. In control apparatus for providing controlled movement of a flexible strip-like recording medium between a supply location from which the strip is withdrawn at a uniform rate and a takeup location to which the strip is advanced at an intermittent rate, the improvement comprising:

means for driving the strip at a sufficient speed to at least establish and maintain a buffer loop between the strip supply location and the strip takeup location;

sensor means responsive to variation in the size of said buffer loop for producing an output which changes between two levels indicative of whether the loop size is above or below a selected size and with a time period corresponding to the period of said intermittent advancement and with a duty cycle corresponding to the time that the loop size differs from said selected size;

means for converting the duty cycle of said changing output to a corresponding signal level; and means for controlling the speed of said drive means as a function of said signal level to substantially maintain said loop at said select size.

15. In apparatus according to claim 14, the further improvement wherein said duty cycle converter means includes:

an integrator circuit having its input connected to receive the output signal from said loop sensor means;

gate means responsive to said loop sensor means output for causing said integrator circuit to start integrating said loop sensor means output signal after a predetermined interval following a transistion in said loop sensor output signal from one level to the other level and to continue said integration until a predetermined interval after said loop sensor signal returns to said one level so as to provide a succession of delayed ramps corresponding to occurrences of said other level;

a diode in series with the output of said integrator circuit;

a peak-following capacitance element connected to the output of said diode;

a gate means for momentarily discharging said capacitance element in response to the loop sensor output returning to said one level, whereby said capacitance element receives the output from said integrator circuit immediately prior to the end of the delayed ramp therefrom; and output stage means for producing the output from said duty cycle converter means in response to the charge on said capacitance element.

16. In apparatus according to claim 15, the further improvement wherein said gate means includes:

means connected to receive said loop sensor output for producing an output gate signal corresponding to transitions between levels in said loop sensor output;

means for removing the portion of said gate signal corresponding to said transitions from said one level to said other level; and shunt circuit means connected to said capacitance element for discharging said capacitance element momentarily in response to said output gate signal.

17. In apparatus according to claim 16, the further improvement wherein said duty cycle converter means includes:

ramping integrator means for producing a constantly increasing signal level when said loop sensor output is at said one level;

peak follower means reproducing the maximum output level of said integrator means; and reset timing means responsive to said loop sensor output for resetting said peak follower at a time corresponding to said loop sensor output changing to said other level and then resetting said integrator means.

18. In apparatus according to claim 17, the further improvement wherein said reset timing means further includes means for resetting said peak follower after a predetermined continuous duration of said other level in said loop sensor means output.

19. In apparatus according to claim 14, the further development wherein said means for controlling said drive means includes:

means for producing a speed signal indicative of the speed at which said drive means is operating; and speed regulation means responsive to said speed signal for maintaining the speed of said drive means as a function of the output of said duty cycle converter means.

20. In apparatus according to claim 14, the further improvement wherein said means for controlling said drive means includes:

dual-rate integrator means for integrating the output of said duty cycle converter means at one of two selectable integration rates of response;

switching means for selecting one or the other of said integrating rates; and means for controlling the speed of said drive means as a function of the output of said integrator means.

21. In apparatus according to claim 20, the further improvement wherein said means for controlling the speed of said drive means includes:

means for producing a speed signal indicative of the speed at which said uniform drive means is operating; and speed regulation means responsive to said speed signal for maintaining the speed of said uniform drive means in accordance with the output of said integrator means.

22. Control apparatus for providing uniform motion synchronized with the average speed of an intermittent motion, said apparatus comprising:

supply means for paying out first and second elongated flexible elements at the same rate;

a first station receiving at least said first element;

intermittent motion means for advancing at least said first element step-wise past said first station at a nominal rate;

a second station receiving at least said second element;

element-engaging drive means for continually advancing at least said second element past said second station at a rate corresponding to said nominal step rate;

return means for taking up said elements at the same rate;

means for introducing a buffer loop into at least said second element to isolate the portion thereof at said second station from said intermittent motion;

loop sensor means for providing an output that changes between two levels indicative of the size of said loop relative to a select size;

means for generating a signal level corresponding to the duty cycle of said loop sensor output;

means for integrating the signal level corresponding to the duty cycle of said loop sensor output at one of two selectable integration rates;

switching means responsive to the loop sensor output for initially selecting the faster rate and for selecting the slower rate in response to a selected condition of said loop relative to said selected loop size;

means for producing a speed signal indicative of the speed at which said drive means is operating; and speed regulation means responsive to said speed signal for maintaining the speed of said drive means in accordance with the output of said integrator means.

23. The apparatus according to claim 22 wherein said first and second flexible elements are separate recording media for a series of visual information frames and for audio information respectively.

24. The apparatus according to claim 23 further comprising:

audio reproduction means operatively associated with said second station for transducing said audio information; and means for muting said audio reproduction during operation with said fast integration rate.

* * * * *